(12) United States Patent
Chiang et al.

(10) Patent No.: US 10,099,301 B2
(45) Date of Patent: Oct. 16, 2018

(54) SAW MACHINE WORKTABLE POSITIONING MECHANISM

(71) Applicant: Lowe's Companies, Inc., Mooresville, NC (US)

(72) Inventors: Hung Jung Chiang, Taichung (TW); Wen Chin Chiang, Taichung (TW)

(73) Assignee: LOWE'S COMPANIES, INC., Mooresville, NC (US)

( * ) Notice: Subject to any disclaimer, the term of this patent is extended or adjusted under 35 U.S.C. 154(b) by 35 days.

(21) Appl. No.: 15/353,774

(22) Filed: Nov. 17, 2016

(65) Prior Publication Data
US 2017/0136560 A1 May 18, 2017

(30) Foreign Application Priority Data

Nov. 18, 2015 (TW) .............................. 104138004 A

(51) Int. Cl.
*B23D 45/04* (2006.01)
*B23D 47/02* (2006.01)
*B27B 5/29* (2006.01)

(52) U.S. Cl.
CPC ......... *B23D 45/044* (2013.01); *B23D 45/048* (2013.01); *B23D 47/025* (2013.01); *B27B 5/29* (2013.01)

(58) Field of Classification Search
CPC .. B23D 45/044; B23D 45/048; B23D 47/025; B27B 5/29

USPC ................................... 83/522.15, 471.3, 581
See application file for complete search history.

(56) References Cited

U.S. PATENT DOCUMENTS

| 8,573,104 B2 * | 11/2013 | Thomas ................. | B23D 47/00 83/471.3 |
| 9,662,724 B1 * | 5/2017 | Knight ................. | B23D 45/024 |
| 2004/0154448 A1 * | 8/2004 | Romo .................. | B23D 47/025 83/471.3 |
| 2011/0036224 A1 * | 2/2011 | Liu ........................... | B27B 5/29 83/471.3 |
| 2011/0041666 A1 * | 2/2011 | Aoyama .................. | B27B 5/29 83/473 |

FOREIGN PATENT DOCUMENTS

| TW | I453080 | 9/2014 |
| TW | I466743 | 1/2015 |

* cited by examiner

*Primary Examiner* — Omar Flores Sanchez
(74) *Attorney, Agent, or Firm* — Kilpatrick Townsend & Stockton LLP

(57) ABSTRACT

A saw machine worktable positioning mechanism includes a pivot shaft, an operating member and a first positioning unit so arranged that operating the operating member can drive the first positioning unit to move a positioning member of the first positioning unit relative to the base of the saw machine in one of two reversed directions to lock the worktable of the saw machine to the base or to unlock the worktable from the base.

8 Claims, 12 Drawing Sheets

SAW MACHINE WORKTABLE POSITIONING MECHANISM

BACKGROUND OF THE INVENTION

1. Field of the Invention

The present invention relates to saw machine technology, and more particularly to a saw machine worktable positioning mechanism used in a saw machine (e.g., miter saw) and operable to lock the worktable of the saw machine.

2. Description of the Related Art

A conventional saw machine (see the description of the related art in Taiwan Patent I466743) generally comprises a base unit, a worktable rotatably supported on the base unit, a saw-cutting unit connected to one side of the worktable, and a positioning unit. The base unit comprises a base and two foot members respectively fastened to two opposite lateral sides of the base. The positioning unit comprises a locking screw threaded into the worktable. When adjusting the cutting angle of the saw-cutting unit, the operator unfastens the locking screw from the worktable, and then rotates the worktable by shifting the saw-cutting unit to the desired cutting angle, and then fastens tightly the locking screw again.

The aforesaid positioning unit can be unfastened for allowing adjustment of the angular position of the saw-cutting unit relative to the base, and then fastened tightly to lock the worktable to the base after adjustment of the angular position of the saw-cutting unit. However, in applying the adjustment, the operator cannot visually check the positioning status of the positioning unit. Further, when rotating the worktable to move the saw-cutting unit relative to the base unit, the lock screw can be forced to rub against the periphery of the worktable, which scratches the periphery of the worktable, e.g., damages the outer surface. Further, the lock screw locks the worktable of the base unit at one single point. If a user fastens the lock screw too tightly, the base can be deformed. If the lock screw is too loose, the worktable will not be locked firmly, resulting in poor positioning.

In order to solve the aforesaid problem, the inventor of the present invention invented Taiwan Patent I466743, which comprises a pivot shaft, a first hold down member, a second clamp, and a linkage unit. Operating an operating member of the linkage unit can bias the linkage unit, forcing a second clamping portion of the second clamp to release the base unit for adjustment of the angular position of the worktable, or to clamp the base unit to lock the worktable.

Further, Taiwan Patent I453080, was also invented by the applicant of the present invention, which teaches the use of a driving device set to hold down an engaging device set and to move a tightening up member in an eccentric manner. Operating the driving device set can simultaneously move the engaging device set and the tightening up member toward or away from the base of the saw machine to lock or unlock the worktable.

SUMMARY OF THE INVENTION

The present invention has been developed in view of the aforementioned circumstances. It is therefore one of the main objects of the present invention to provide a saw machine worktable positioning mechanism, which has a simple structure and is easily operable to lock or unlock the worktable of the saw machine.

To achieve this and other objects of the present invention, a saw machine worktable positioning mechanism is used in a saw machine, e.g., a miter saw. The saw machine comprises a base, a worktable rotatably supported on the base, and a saw-cutting unit pivotally connected to one side of the worktable. The base comprises a top wall, a bottom wall opposite to the top wall, an outer perimeter wall connected between the top wall and the bottom wall, and a plurality of retaining grooves located on and spaced around the outer perimeter wall. The saw machine worktable positioning mechanism comprises a pivot shaft, an operating member, a sub positioning unit, and a first positioning unit. The pivot shaft is mounted in the extension member of the worktable. The operating member is rotatable relative to the extension member, comprising a pivot-connection portion pivotally connected to the pivot shaft, a first detent portion located at one side of the pivot-connection portion, a second detent portion located at one lateral side of the first detent portion, and an operating portion located at an opposite side of the pivot-connection portion. The sub positioning unit comprises a sliding rod slidably mounted in the extension member and extending in a radial axis direction, comprising a bearing end portion located at one end thereof and facing toward the operating member and an engagement end portion located at an opposite end thereof and disposed in proximity to the base. The first detent portion is rotatable relative to the bearing end portion to move the sliding rod linearly relative to the extension member along the radial axis direction for enabling the engagement end portion to be shifted from the position far from the bottom wall to a position in engagement with the bottom wall. The first positioning unit comprises a link floatably mounted at one side of the extension member, and a positioning member pivotally connected between the extension member and the link. The link comprises an interlocking end pivotally connected to the second detent portion, and an opposing driving end connected to the positioning member. The positioning member comprises a positioning portion disposed in proximity to the base. The second detent portion is adapted for driving the link to move the positioning portion relative to the top wall of the base between a disengaged position where the positioning portion is kept away from the top wall of the base, and an engaged position where the positioning portion is forced into friction engagement with the top wall of the base.

One of the main benefits of the present invention is that operating the operating member can simultaneously drive the sub positioning unit and the first positioning unit, forcing an engagement end portion of the sub positioning unit and the positioning member of the first positioning unit relative to the base to lock the worktable to the base, or to unlock the worktable from the base. The overall structure of the saw machine worktable positioning mechanism is quite simple, to facilitate operation.

Other advantages and features of the present invention will be understood by reference to the following specification in conjunction with the accompanying drawings, in which like reference characters denote like elements of structure.

DETAILED DESCRIPTION OF THE INVENTION

Figure 1:
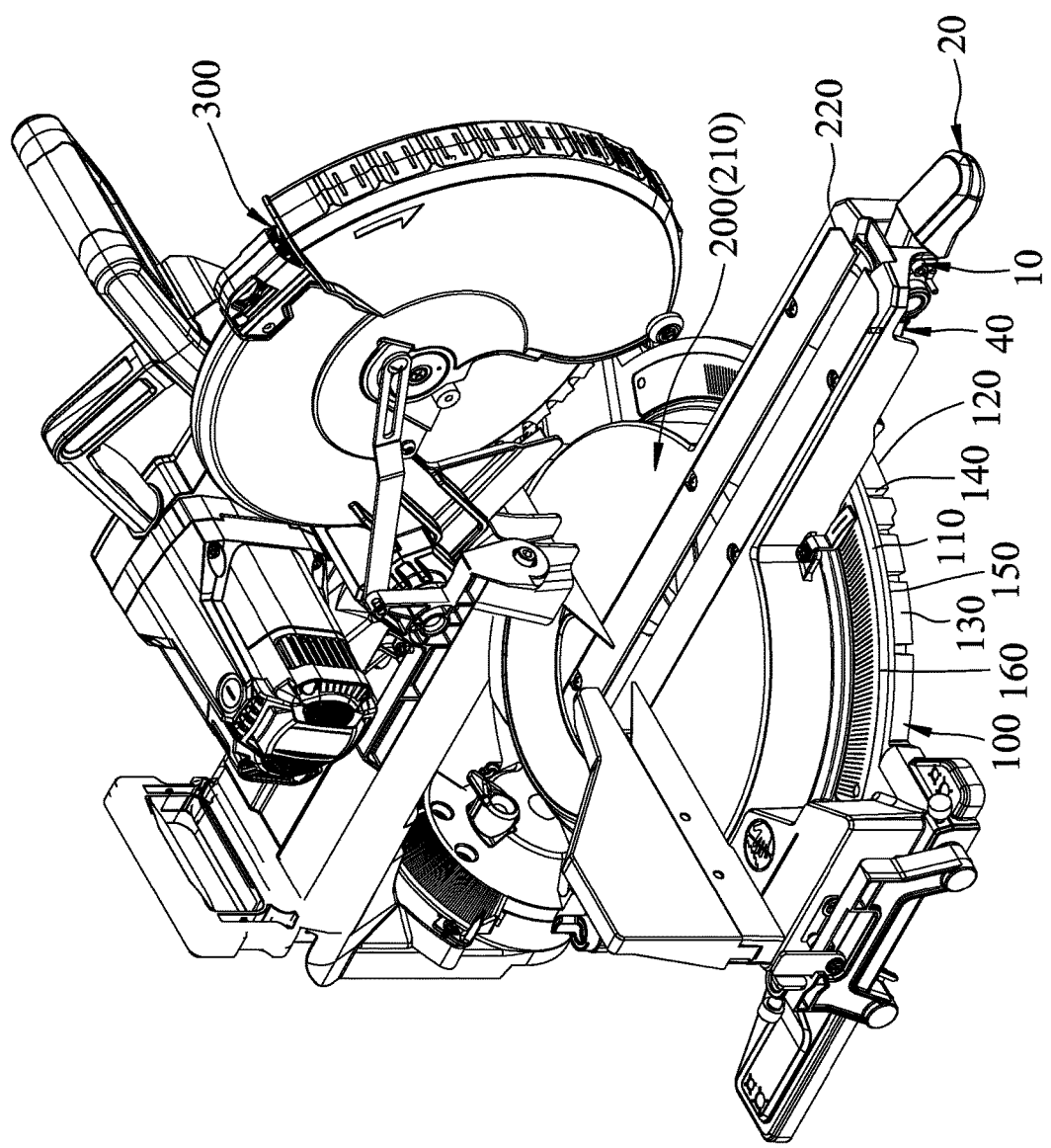
FIG. 1 is an oblique top elevational view of a saw machine worktable positioning mechanism in accordance with the present invention.
Figure 2:
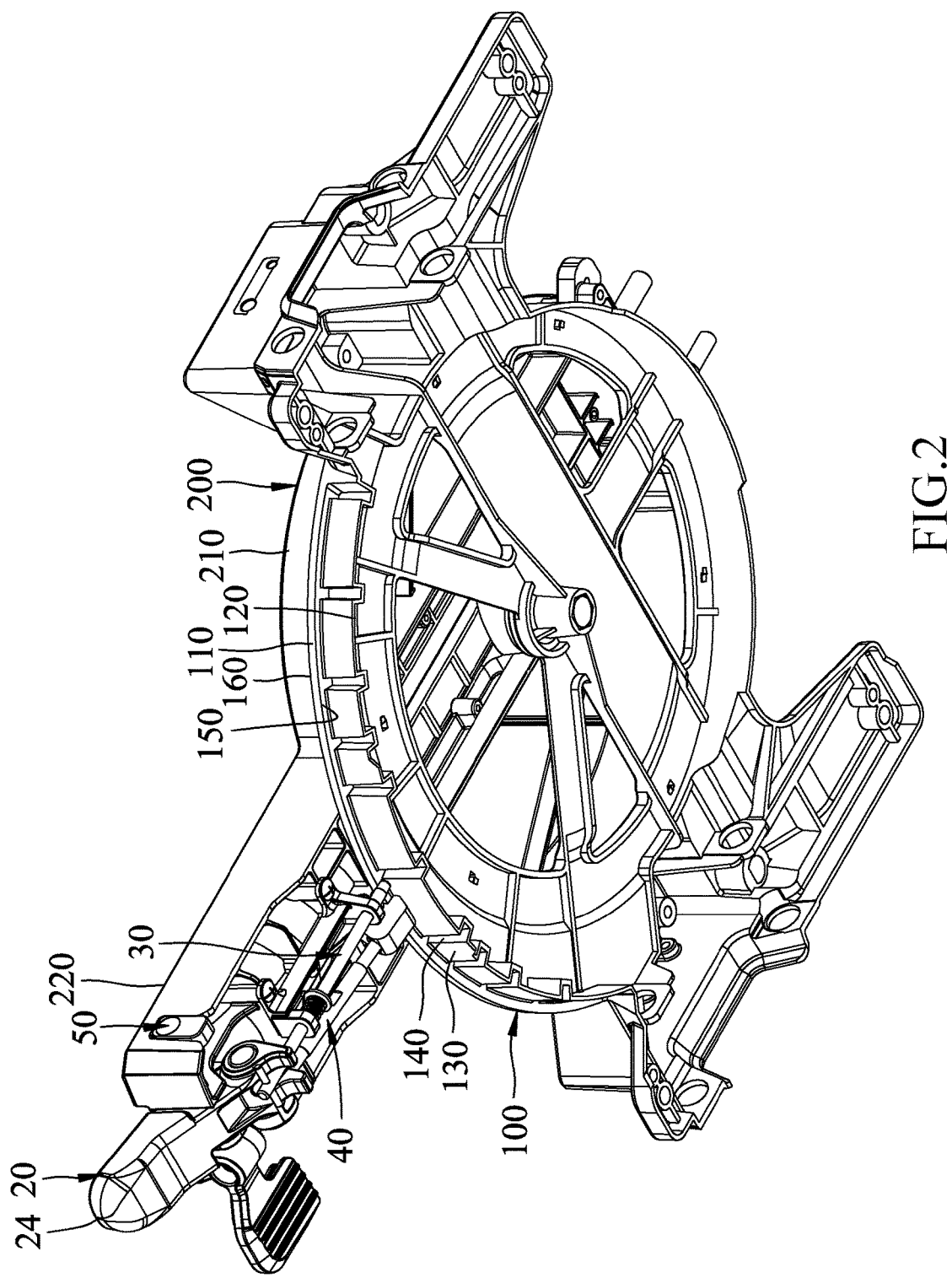
FIG. 2 is an oblique bottom elevational view of the saw machine worktable positioning mechanism in accordance with the present invention.
Figure 3:
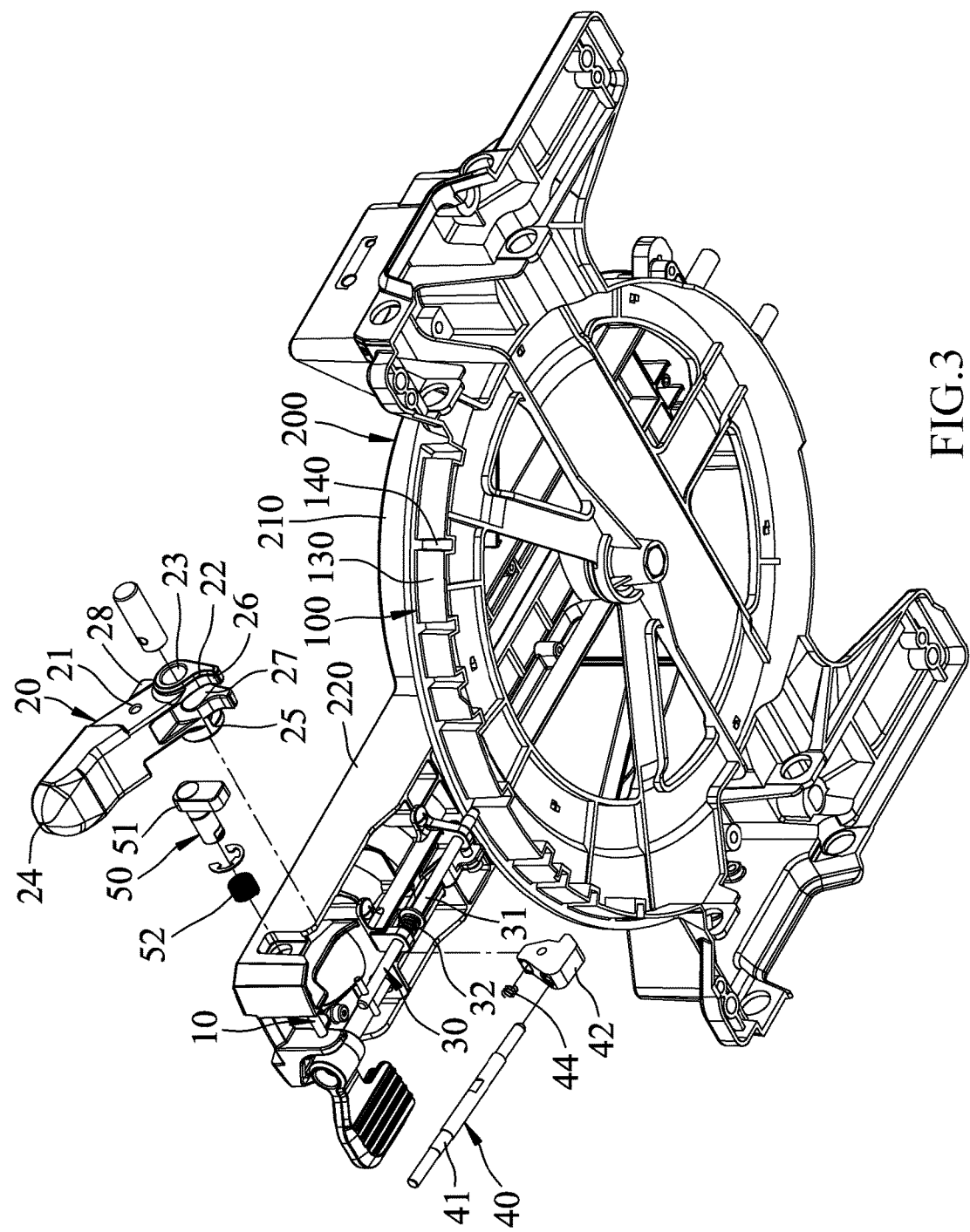
FIG. 3 is an exploded view of the saw machine worktable positioning mechanism in accordance with the present invention.
Figure 4:
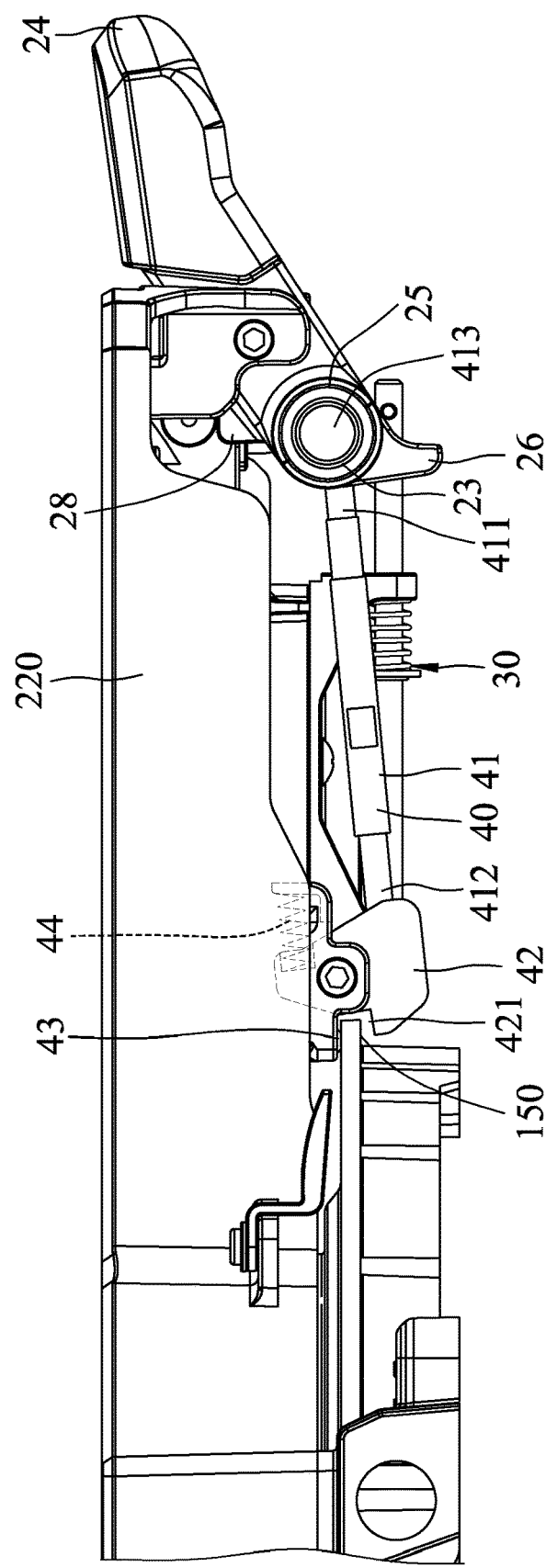
FIG. 4 is a schematic plain assembly view of the first positioning unit of the saw machine worktable positioning mechanism in accordance with the present invention.
Figure 5:
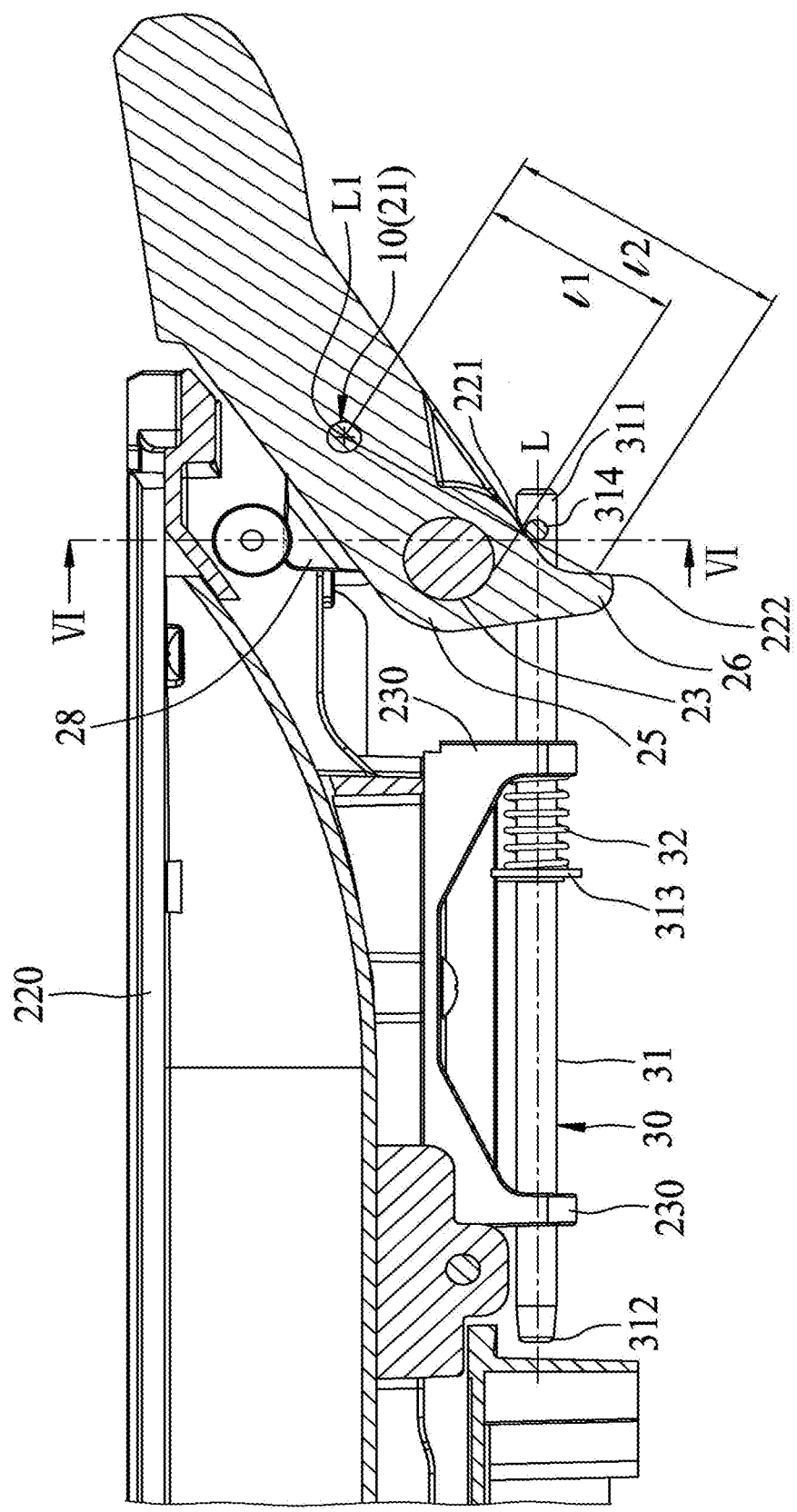
FIG. 5 is a schematic plain assembly view of the sub positioning unit of the saw machine worktable positioning mechanism in accordance with the present invention.

Referring to FIGS. 3, 4 and 5, a saw machine worktable positioning mechanism in accordance with the present invention is shown. The saw machine comprises a base 100, a worktable 200 rotatably supported on the base 100, and a saw-cutting unit 300 pivotally connected to one side of the worktable 200. The base 100 comprises a top wall 110, a bottom wall 120 opposite to the top wall 110, an outer perimeter wall 130 connected between the top wall 110 and the bottom wall 120, and a plurality of retaining grooves 140 located on and spaced around the outer perimeter wall 130. The top wall 110 protrudes radially over the outer perimeter wall 130, and comprises a bottom surface 150 perpendicularly connected to the outer perimeter wall 130 and an opposing top surface 160. The retaining grooves 140 are spaced around the outer perimeter wall 130 at a predetermined angle, for example, an angle between 5-45°, and preferably at 15° angles. The worktable 200 comprises turntable 210, and an extension member 220 radially extended from the turntable 210. The extension member 220 comprises a pair of pivot plates 230 connected to the bottom wall 120 in a parallel manner and extending along an axis L, and a position-limiting block 240 located at a rear end of the extension member 220. The extending direction of the axis L corresponds to the radial direction of the turntable 210. As illustrated, the saw machine worktable positioning mechanism comprises a pivot shaft 10, an operating member 20, a sub positioning unit 30, a first positioning unit 40, and a locking unit 50.

The pivot shaft 10 is mounted in or under the extension member 220 near the bottom wall 120 to extend along a center line L1 perpendicular to the axis L.

As illustrated in FIG. 4 and FIG. 5, the operating member 20 can be biased relative to the extension member 220, and comprises a pivot-connection portion 21 pivotally connected to the pivot shaft 10, a first detent portion 22 located at one side of the pivot-connection portion 21, a second detent portion 23 located at one lateral side of the first detent portion 22, an operating portion 24 located at an opposite side of the pivot-connection portion 21, an axle sleeve 25 for the mounting of the second detent portion 23, a plurality of, for example, two claws 26 perpendicularly extended from one side of the axle sleeve 25 opposite to the operating portion 24, a channel 27 disposed between the claws 26 and the axle sleeve 25, and an engagement portion 28. The first detent portion 22 extends from the periphery of the axle sleeve 25 to one side of the claws 26. The first detent portion 22 is a parabolic member, comprising a first end 221 that defines a first distance l1 with the center line L1, and a second end 222 that defines a second distance l2 with the center line L1. The second end 222 is located at a rear end of the claws 26. The second distance l2 is larger than the first distance l1. Further, the first detent portion 22 extends from the first end 221 to the second end 222 in such a manner that the distance between the first detent portion 22 and the center line L1 is gradually increased in a direction from the first end 221 toward the second end 222. The second detent portion 23 is shaped like a pivot hole. The engagement portion 28 is disposed at one side of the pivot-connection portion 21, and shaped like a triangle plate.

Referring to FIG. 4 again, the first positioning unit 40 comprises a link 41 floatably mounted on one side of the extension member 220 and movable by the second detent portion 23, where a positioning member 42 is pivotally connected to the extension member 220 and the link 41, a stop block 43 is mounted at a bottom wall of the extension member 220 and protrudes toward the top surface 160, and a elastic member 44 is mounted between the extension member 220 and the positioning member 42. The link 41 comprises an interlocking end 411 pivotally connected to the second detent portion 23, an opposing driving end 412 connected to the positioning member 42, and a cylindrical axle 413 perpendicularly fastened to the interlocking end 411. The cylindrical axle 413 is rotatably connected to the second detent portion 23. The positioning member 42 comprises a flat positioning portion 421 disposed in proximity to the base 100 to face toward the bottom surface 150 and toward the stop block 43. The elastic member 44 imparts an elastic restoring force to force the flat positioning portion 421 in direction away from the bottom surface 150, for example, when the elastic member 44 is a spring.

Referring to FIG. 5 again, the sub positioning unit 30 comprises a sliding rod 31 slidably mounted in or under the extension member 220, and a spring 32 mounted around the sliding rod 31. The sliding rod 31 extends along the axis L and inserted through the channel 27 and the pivot plates 230, and comprises a bearing end portion 311 located at one end thereof corresponding to the operating member 20, an engagement end portion 312 located at an opposite end thereof near the base 100, an annular stop flange 313 spaced between the bearing end portion 311 and the engagement end portion 312 and disposed at one side of one of the pivot plates 230, and a guide rod 314 extended from the bearing end portion 311 and abutted to the first detent portion 22. The spring 32 is stopped between the annular stop flange 313 and the respective pivot plate 230 to impart an elastic restoring force, forcing the engagement end portion 312 in direction toward the outer perimeter wall 130 and the guide rod 314 into abutment against the first detent portion 22.

Figure 6:
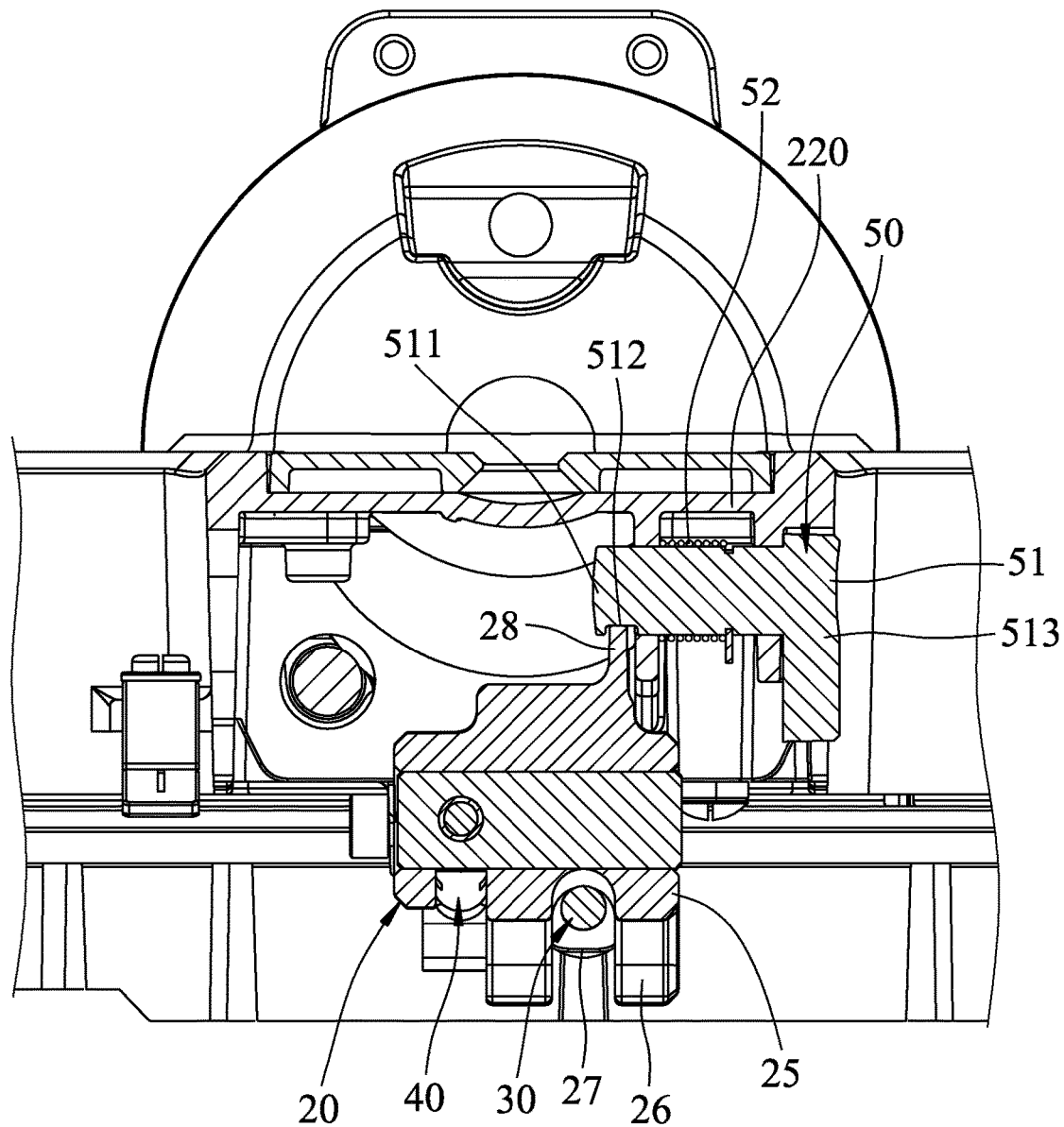
FIG. 6 is a sectional view taken along line VI-VI of FIG. 5.

Referring to FIG. 6, the locking unit 50 faces toward the engagement portion 28, comprising a press knob 51 and a return spring 52 stopped between the press knob 51 and the extension member 220. The press knob 51 comprises an inner end 511 located at one end thereof and disposed in proximity to the operating member 20, a retaining portion 512 located at the inner end 511 for engagement with the engagement portion 28, and a pressing end 513 located at an opposite end thereof and disposed outside the extension member 220. The retaining portion 512 in the present preferred embodiment is a retaining groove. The return spring 52 imparts an elastic restoring force to hold, e.g., pushes away, the retaining portion 512 far or away from the engagement portion 28 when the retaining portion 612 is not engaged with the engagement portion 28.

Referring to FIGS. 1, 4, 5 and 6 again, the worktable 200 is rotatable on the base 100 and the cutting angle of the saw-cutting unit 300 is adjustable. At this time, the engagement portion 28 of the operating member 20 is secured by the retaining portion 512 of the locking unit 50 in a locking position to hold the engagement end portion 312 of the sliding rod 31 of the sub positioning unit 30 away from the outer perimeter wall 130, and the positioning portion 421 of the positioning member 42 of the first positioning unit 40 is kept away from the bottom surface 150, e.g., via the elastic member 44.

Figure 7:
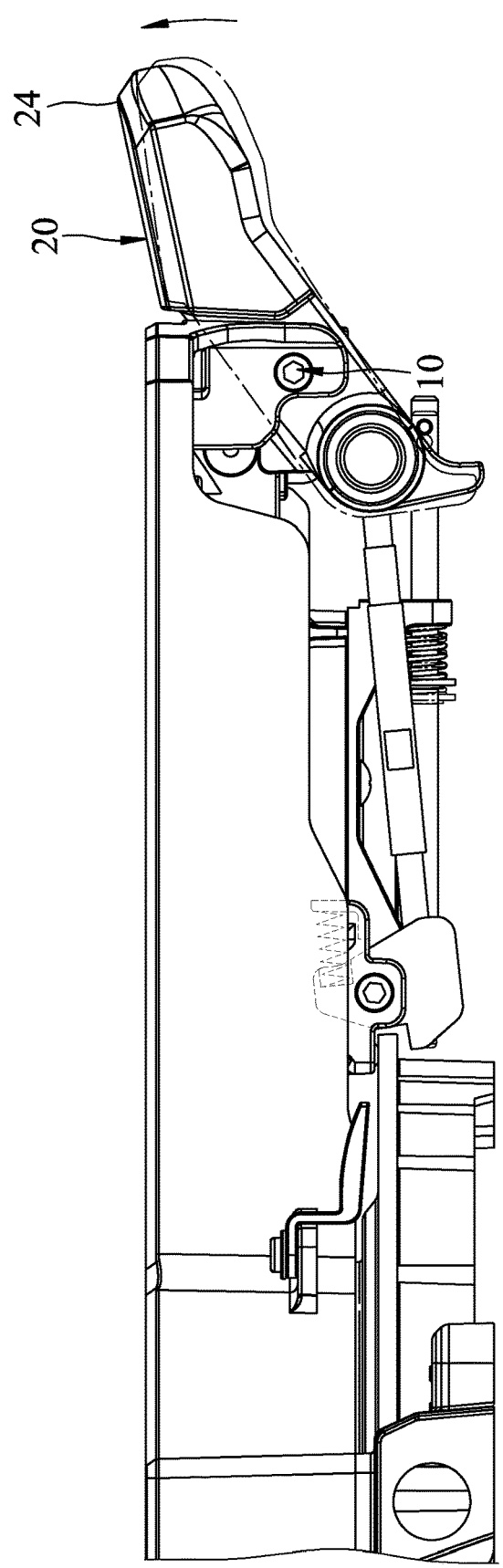
FIG. 7 is a schematic operational view of the present invention, illustrating the operating member operated and the first positioning unit moved.
Figure 8:
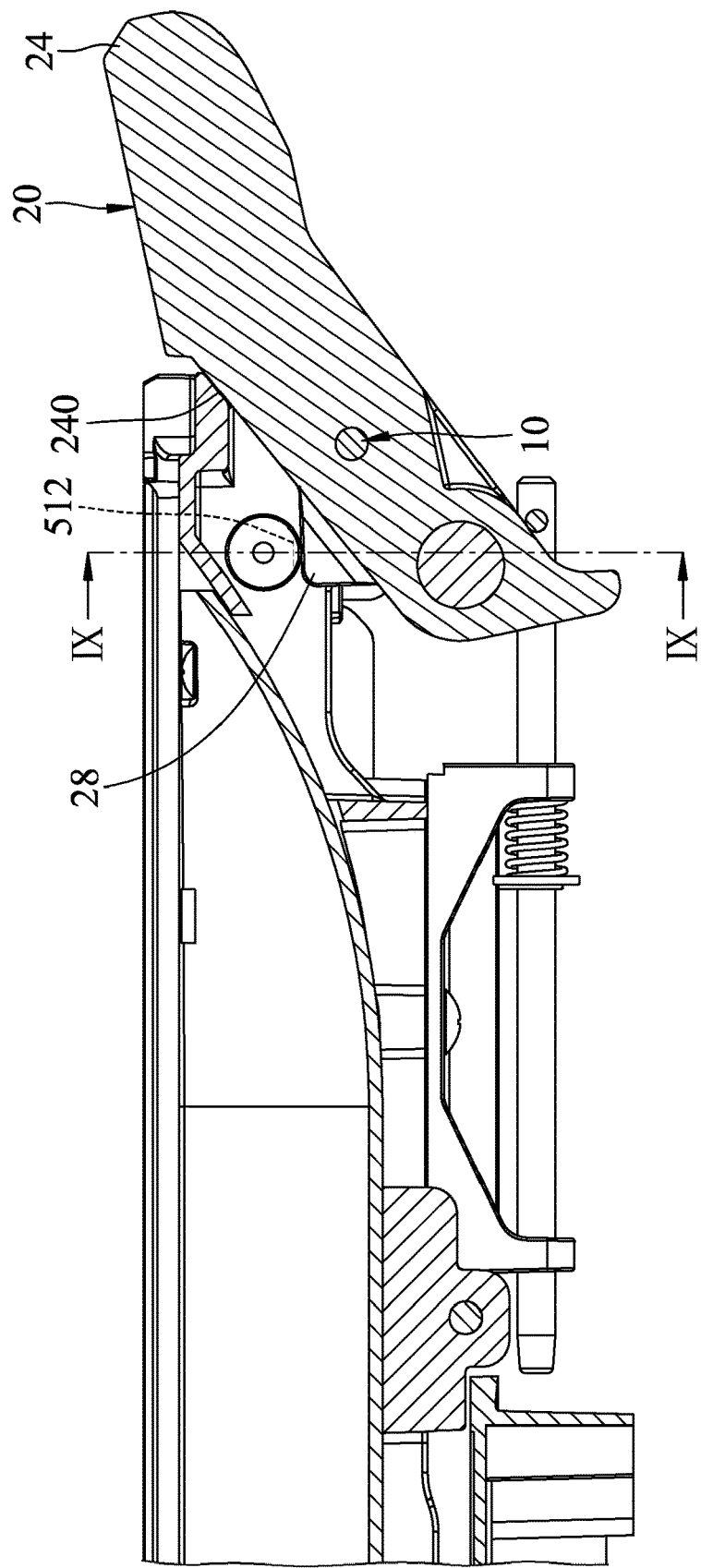
FIG. 8 corresponds to FIG. 7, illustrating the sub positioning unit moved by the operating member.
Figure 9:
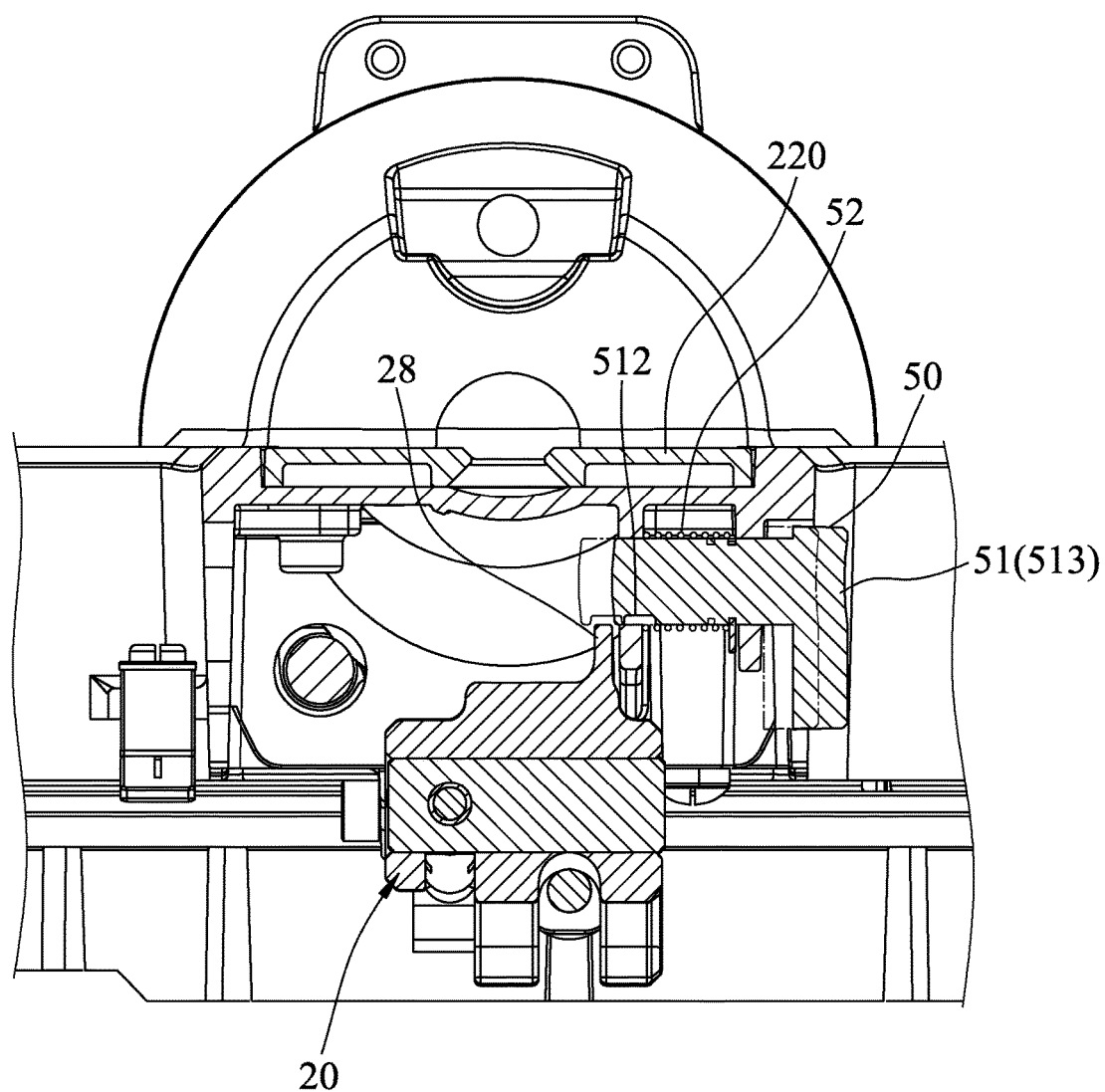
FIG. 9 is a sectional view taken along line IX-IX of FIG. 8.

To operate the operating portion 24 of the operating member 20 and rotate the worktable 200 relative to the base 100 to the desired angular position as illustrated by the imaginary line in FIG. 7 and the solid line in FIG. 8, the operator can bias the operating portion 24 of the operating member 20 upward. At this time, the operating member 20 is turned about the pivot shaft 10 counter-clockwise to the position shown in FIG. 8 where the operating member 20 is stopped by the position-limiting block 240 and the engagement portion 28 is moved out of the retaining portion 512. At this time, as illustrated in FIG. 9, the press knob 51 of the locking unit 50 is forced by the elastic restoring force of the return spring 52 to move the pressing end 513 toward the outside of the extension member 220, and thus, the engagement portion 28 and the retaining portion 512 are disengaged from each other to unlock the operating member 20.

Figure 10:
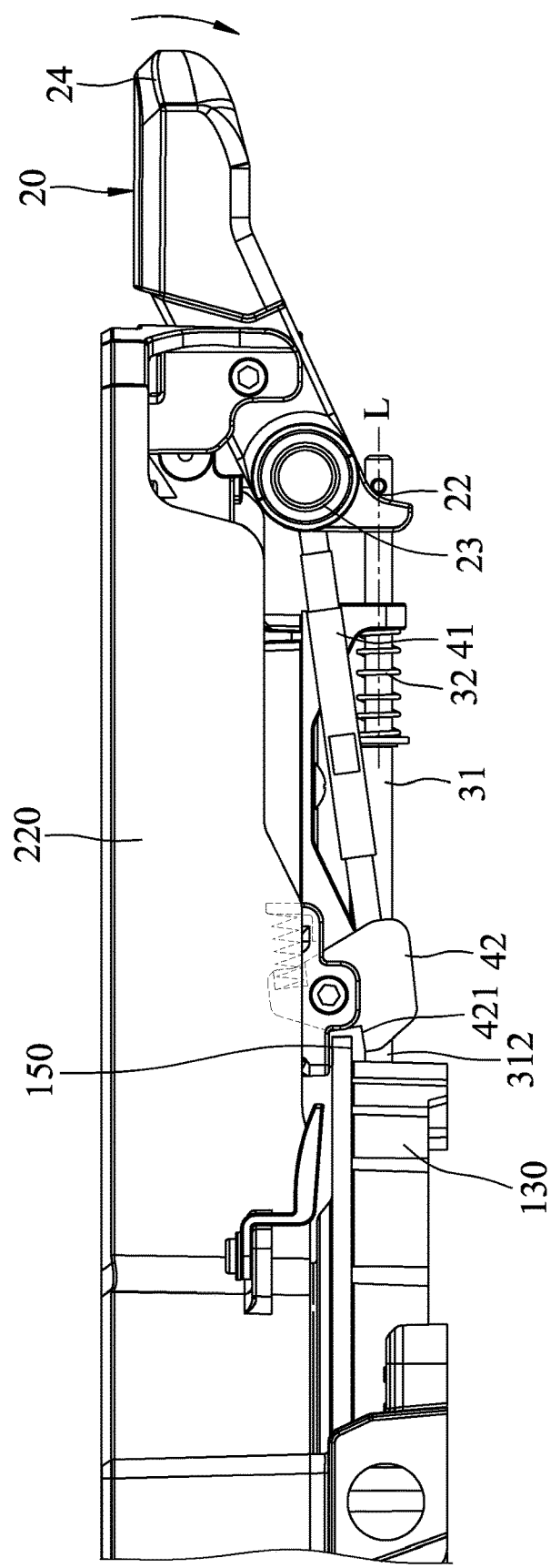
FIG. 10 is another schematic operational view of the present invention, illustrating the operating member continuously operated and the first positioning unit moved into proximity to the worktable.

Thereafter, when the operator operates the operating portion 24 of the operating member 20 in the clockwise direction as illustrated in FIG. 10, the first detent portion 22 of the operating member 20 is biased clockwise, and the elastic restoring force of the spring 32 forces the sliding rod 31 to move along the axis L, forcing the engagement end portion 312 toward the outer perimeter wall 130. At this time, the second detent portion 23 drives the link 41 to move relative to the extension member 220 and to bias the positioning member 42 relative to the extension member 220, moving the positioning portion 421 toward the bottom surface 150.

Figure 11:
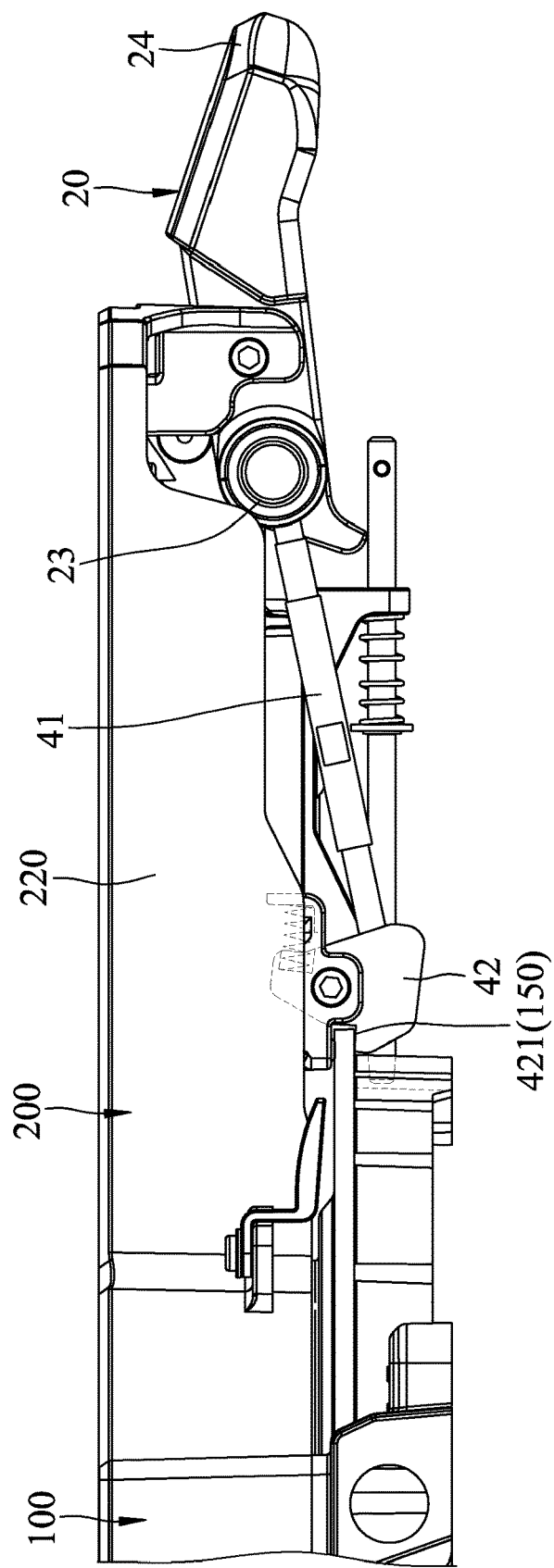
FIG. 11 corresponds to FIG. 10, illustrating the first positioning unit forced into engagement with the worktable.
Figure 12:
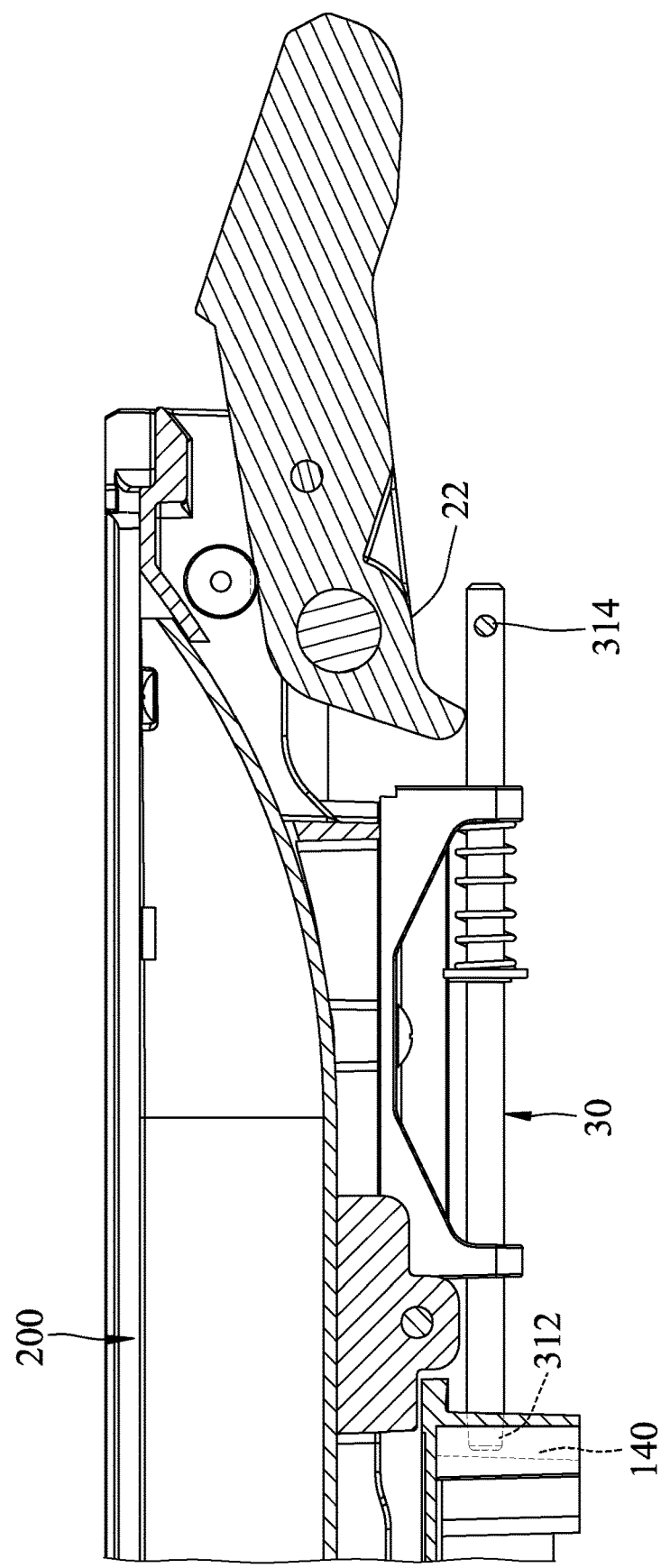
FIG. 12 corresponds to FIG. 11, illustrating the sub positioning unit forced into engagement with the worktable.

After rotation of the worktable 200 relative to the base 100 to the desired angular position, the operator can then push the operating portion 24 of the operating member 20 further clockwise as illustrated in FIGS. 11 and 12. At this time, the second detent portion 23 drives the link 41 to move relative to the extension member 220 and to bias the positioning member 42 relative to the extension member 220, moving the positioning portion 421 into friction engagement with the bottom surface 150. At the same time, the stop block 43 is stopped against the top surface 160 to hold down the worktable 200 on the base 100. Further, after having rotated the worktable 200 relative to the base 100 to the desired angular position, where the engagement end portion 312 is engaged with a retaining groove 140 in the desired angular position, the sub positioning unit 30 can be used to lock the worktable 200 to the base 100. At this time, the first detent portion 22 can be completely disengaged from the guide rod 314.

When rotating the worktable 200 relative to the base 100 at this time, the operator simply needs to bias the operating member 20 in the counter-clockwise direction, as illustrated in FIG. 11, causing the claws 26 to move towards, e.g., pick up and/or engage, the guide rod 314 and to contact the guide rod 314 with the first detent portion 22 and simultaneously move the engagement end portion 312 of the sliding rod 31 away from the outer perimeter wall 130 (at this time, the spring 32 is squeezed by the annular stop flange 313 to preserve elastic restoring energy). At the same time, the second detent portion 23 drives the link 41, so that the positioning member 42 is forced by the elastic member 44 away from the bottom surface 150, and thus, the operating member 20 can be returned to the status shown in FIG. 7 and FIG. 8. When the operator presses the press knob 51 of the locking unit 50 at this time, the engagement portion 28 of the operating member 20 is forced into engagement with the retaining portion 512, enabling the sub positioning unit 30 and the first positioning unit 40 to be positively positioned relative to the extension member 220.

Thus, the invention allows the user to operate the single operating member 20 to move the sub positioning unit 30 through the first detent portion 22, forcing the engagement end portion 312 of the sliding rod 31 from the disengaged position away from the outer perimeter wall 130 into an engaged position in engagement with one retaining groove 140. Operating the single operating member 20 can simultaneously move the first positioning unit 40, moving the positioning portion 42 into friction engagement with or away from the bottom surface 150.

In conclusion, the saw machine worktable positioning mechanism has a simple structure and facilitates operation to lock and unlock the worktable. It does not scratch the outer perimeter wall 130 of the base 100 during operation, and can produce a retaining force to lock the worktable positively.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A saw machine worktable positioning mechanism for use in a saw machine comprising a base defining a top wall and an opposing bottom wall, a worktable rotatably supported on said base and a saw-cutting unit coupled to one side of said worktable, said worktable comprising a turntable and an extension member radially extended from said turntable, the saw machine worktable positioning mechanism comprising:

a pivot shaft mounted in said extension member of said worktable;

an operating member rotatable relative to said extension member, said operating member comprising a pivot-connection portion pivotally connected to said pivot shaft, a first detent portion located at one side of said pivot-connection portion, a second detent portion located at one lateral side of said first detent portion, and an operating portion located at an opposite side of said pivot-connection portion; and a first positioning unit comprising a link mounted at one side of said extension member and a positioning member pivotally connected between said extension member and said link, said link comprising an interlocking end pivotally connected to said second detent portion and an opposing driving end connected to said positioning member, said positioning member comprising a positioning portion disposed in proximity to said base, said operating member being adapted for driving said link to move said positioning portion relative to said top wall of said base between a disengaged position where said positioning portion is kept away from said top wall of said base and an engaged position where said positioning portion is forced into friction engagement with said top wall of said base.

2. The saw machine worktable positioning mechanism as claimed in claim 1, wherein said operating member comprises an engagement portion disposed at one side of said pivot-connection portion; the saw machine worktable positioning mechanism further comprising a locking unit configured to engage said engagement portion, said locking unit comprising a press knob mounted at said extension member and a return spring provided between said press knob and said extension member, said press knob comprising an inner end located at one end thereof and disposed in proximity to said operating member, a retaining portion located at said inner end for engagement with said engagement portion, and a pressing end located at an opposite end thereof and disposed outside said extension member, said pressing end being operable to move said retaining portion into engagement with said engagement portion, said returning spring being adapted for providing an elastic restoring force to force said retaining portion away from said engagement portion.

3. The saw machine worktable positioning mechanism as claimed in claim 1, further comprising a sub positioning unit, said sub positioning unit comprising a sliding rod slidably mounted in said extension member and extending in a radial axis direction of the worktable, said sliding rod comprising a bearing end portion located at one end thereof near said operating member and an engagement end portion located at an opposite end thereof and disposed in proximity to said base, wherein said first detent portion is rotatable relative to said bearing end portion to move said sliding rod linearly relative to said extension member along said radial axis direction for enabling said engagement end portion to be shifted from a position away from said bottom wall to a position in engagement with said bottom wall.

4. The saw machine worktable positioning mechanism as claimed in claim 3, wherein said extension member comprises a pair of pivot plates extending along said radial axis direction for the insertion of said sliding rod; said pivot shaft extends along a center line; said first detent portion of said operating member is a parabolic member, comprising a first end that defines with said center line a first distance, and a second end that defines with said center line a second distance, said second distance being larger than said first distance, said first detent portion extending from said first end to said second end in such a manner that the distance between said first detent portion and said center line is gradually increased in a direction from said first end toward said second end; said sliding rod further comprises a guide rod extending from said bearing end portion that is abuttable to said first detent portion, an annular stop flange disposed at one side of one said pivot plates; said sub positioning unit further comprises a spring mounted around said sliding rod and stopped between said annular stop flange and the respective said pivot plate to impart an elastic restoring force for moving said engagement end portion toward said outer perimeter wall.

5. The saw machine worktable positioning mechanism as claimed in claim 4, wherein said top wall protrudes radially over said outer perimeter wall, and comprises a bottom surface perpendicularly connected to said outer perimeter wall and an opposing top surface; said first positioning unit further comprises a stop block mounted at said extension member and protruding toward said top surface; said positioning portion of said positioning member faces toward said bottom surface and toward said stop block; said operating member is adapted for driving said link to move said positioning portion relative to said bottom surface of said base between a disengaged position where said positioning portion is kept away from said bottom surface of said base and an engaged position where said positioning portion is force into friction engagement with said bottom surface of said base.

6. The saw machine worktable positioning mechanism as claimed in claim 1, wherein said first positioning unit further comprises an elastic member mounted between said extension member and said positioning member and adapted for providing an elastic restoring force to hold said positioning portion away from said top wall.

7. The saw machine worktable positioning mechanism as claimed in claim 4, wherein said operating member further comprises an axle sleeve for holding said second detent portion, a pair of claws perpendicularly extended from one side of said axle sleeve opposite said operating portion, and a channel disposed between said claws and said axle sleeve for the passing of said sliding rod; said first detent portion extends from said axle sleeve to said claws.

8. The saw machine worktable positioning mechanism as claimed in claim 1, wherein said link further comprises an axle perpendicularly fastened to said interlocking end and rotatably connected to said second detent portion.

* * * * *